US008850327B2

(12) United States Patent
Chen et al.

(10) Patent No.: US 8,850,327 B2
(45) Date of Patent: Sep. 30, 2014

(54) METHOD AND APPARATUS FOR DYNAMIC SORTING AND DISPLAYING OF LISTING DATA COMPOSITION AND AUTOMATING THE ACTIVATION EVENT (75) Inventors: Yen-Fu Chen, Austin, TX (US); Raymond Tang Wang, Austin, TX (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 2924 days.

(21) Appl. No.: 10/427,279

(22) Filed: Apr. 30, 2003

(65) Prior Publication Data

US 2004/0221242 A1    Nov. 4, 2004

(51) Int. Cl.
*G06F 3/00* (2006.01)
*G06F 3/048* (2013.01)
*G06F 17/24* (2006.01)
*G06F 3/0482* (2013.01)

(52) U.S. Cl.
CPC ............ *G06F 17/243* (2013.01); *G06F 3/0482* (2013.01)
USPC .......................................... 715/745; 715/843

(58) Field of Classification Search
CPC ................................ G06F 3/00; G06F 3/048
USPC ................... 715/745, 843, 779, 783
See application file for complete search history.

(56) References Cited

U.S. PATENT DOCUMENTS

| | | | |
|---|---|---|---|
| 5,276,797 A | 1/1994 | Bateman et al. | 395/161 |
| 5,491,784 A * | 2/1996 | Douglas et al. | 715/810 |
| 5,530,796 A * | 6/1996 | Wang | 715/762 |
| 5,664,210 A | 9/1997 | Fleming et al. | 395/793 |
| 5,691,744 A * | 11/1997 | Anstotz et al. | 715/745 |
| 5,781,193 A | 7/1998 | Alimpich et al. | 345/352 |
| 5,802,526 A * | 9/1998 | Fawcett et al. | 379/88.13 |
| 5,828,376 A | 10/1998 | Solimene et al. | 395/352 |
| 5,867,162 A | 2/1999 | O'Leary et al. | 345/352 |
| 5,920,316 A * | 7/1999 | Oran et al. | 715/779 |
| 5,930,813 A | 7/1999 | Padgett et al. | 707/539 |
| 5,982,370 A | 11/1999 | Kamper | 345/356 |

(Continued)

FOREIGN PATENT DOCUMENTS

FR              0540445         5/1993          ............. G06F 3/033

OTHER PUBLICATIONS

Screen Dumps of Internet Explorer (2001, pp. 1-5).*
Screen Dumps of Microsoft Windows XP (2001, pp. 1-4).*

*Primary Examiner* — Doon Chow
*Assistant Examiner* — Le Nguyen
(74) *Attorney, Agent, or Firm* — Yee & Associates, P.C.

(57) ABSTRACT

A Drop Down Menu Program having an Item Selection Program, a Sorting Program, and a Recall Program. The Item Selection Program eliminates the need for the user to hold down the shift key or the control key while making multiple selections. Instead, the user may activate a menu item to highlight it, and activate the menu item again to remove the highlight. The user may also open and close the drop down menu. The Sorting Program organizes the menu items in order of frequency of use. The Sorting Program also provides ascending and descending sort buttons that allow the user to sort the menu items in ascending or descending alphabetical, numeric, or chronological order. The Recall Program creates a recall list of selected menu items when the user activates a recall button. The recall list can be displayed and removed independent of opening and closing actions of the drop down menu.

3 Claims, 8 Drawing Sheets

(56) References Cited

U.S. PATENT DOCUMENTS

| | | | |
|---|---|---|---|
| 6,160,552 A * | 12/2000 | Wilsher et al. | 715/739 |
| 6,160,555 A | 12/2000 | Kang et al. | 345/358 |
| 6,208,340 B1 | 3/2001 | Amin et al. | 345/339 |
| 6,240,430 B1 | 5/2001 | Deike et al. | 707/539 |
| 6,292,813 B1 * | 9/2001 | Wolfe | 715/205 |
| 6,397,228 B1 | 5/2002 | Lamburt et al. | 707/203 |
| 6,434,568 B1 | 8/2002 | Bowman-Amuah | 707/103 |
| 6,466,237 B1 * | 10/2002 | Miyao et al. | 715/838 |
| 6,484,189 B1 * | 11/2002 | Gerlach et al. | 715/201 |
| 6,781,611 B1 * | 8/2004 | Richard | 715/779 |
| 7,358,956 B2 * | 4/2008 | Hinckley et al. | 345/156 |
| 8,032,843 B2 * | 10/2011 | Ording et al. | 715/862 |
| 2002/0187462 A1 * | 12/2002 | Mariappan | 434/350 |
| 2003/0117440 A1 * | 6/2003 | Hellyar et al. | 345/767 |
| 2004/0075866 A1 * | 4/2004 | Thormodsen et al. | 358/1.18 |
| 2004/0153456 A1 * | 8/2004 | Charnock et al. | 707/10 |
| 2004/0153992 A1 * | 8/2004 | Molina-Moreno et al. | 717/105 |
| 2004/0201627 A1 * | 10/2004 | Maddocks et al. | 345/762 |
| 2005/0246331 A1 * | 11/2005 | De Vorchik et al. | 707/3 |
| 2006/0085760 A1 * | 4/2006 | Anderson et al. | 715/778 |

* cited by examiner

METHOD AND APPARATUS FOR DYNAMIC SORTING AND DISPLAYING OF LISTING DATA COMPOSITION AND AUTOMATING THE ACTIVATION EVENT

FIELD OF THE INVENTION

The present invention is related to improvements in the manipulation of data on a graphical user interface. Specifically, the present invention is an improved method of making multiple selections, sorting menu items, and recalling selected menu items from a drop down menu in a windows or similar environment.

BACKGROUND OF THE INVENTION

Web pages viewable over the Internet are well known in the art. Some web pages provide users with information without user interaction. However, the vast majority of web pages are user interactive with the web page designed to extract information from the user. For example, most business web pages are interactive in nature allowing the user to view, select, and purchase goods and services directly off of the web page.

Figure 1:
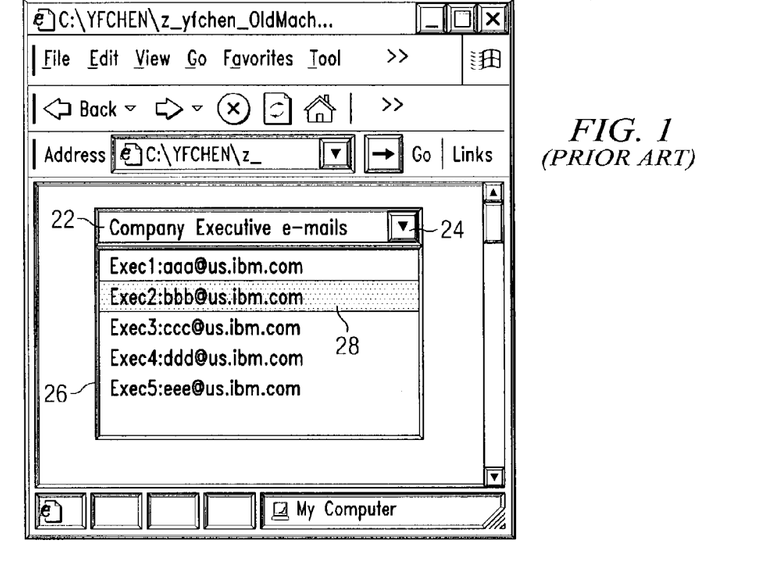
FIG. 1 is an illustration of a prior art drop down menu in which all of the menu items are displayed on the menu screen.

An important tool used by web page designers to extract information from the users is a drop down menu. Drop down menus for web pages and computer applications are well known in the art. A drop down menu is hidden until the user clicks on a down button to open a list from which the user can select the applicable menu item. The user may then close the drop down menu by clicking the down button a second time. FIG. 1 is an illustration of a typical prior art drop down menu. The drop down menu contains dialogue box 22 and down button 24. The user clicks down button 24 and a list of available menu items appears on menu 26. The user can then highlight desired menu item 28 and click down button 24 again to close the menu. Drop down menus of this type are used in a wide variety of different menus to present the user with a list of finite options such as, for example, email lists, account lists, lists of states or countries, or lists of different credit cards.

Figure 2:
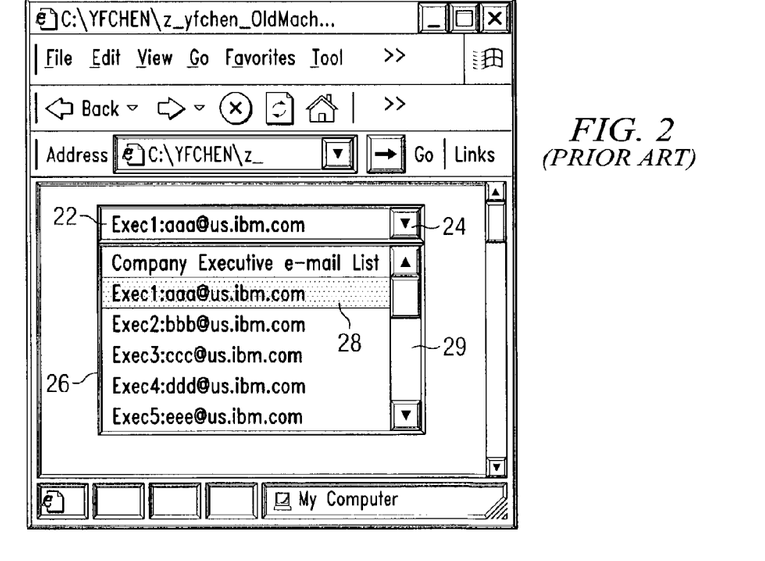
FIG. 2 is an illustration of a prior art drop down menu containing a scroll bar in which a limited number of menu items are displayed on the menu screen.

In some applications the number of available choices can be extensive. For example, if the menu is a list of all fifty states of the United States of America, the list would extend to the bottom of the window or off of the viewable area. One solution to the problem of extensive menu choices is to add a vertical scroll bar to menu 26. As seen in FIG. 2, vertical scroll bar 29 allows the user to browse the list of available items on menu 26 and select desired menu item 28. Desired menu item 28 remains highlighted even when the user scrolls through menu 26 and views the other menu items. Desired menu item 28 remains highlighted until the user selects a new menu item. In many embodiments, desired menu item 28 will appear in place of dialogue box 22 when down button 24 is clicked to close menu 26.

Figure 3:
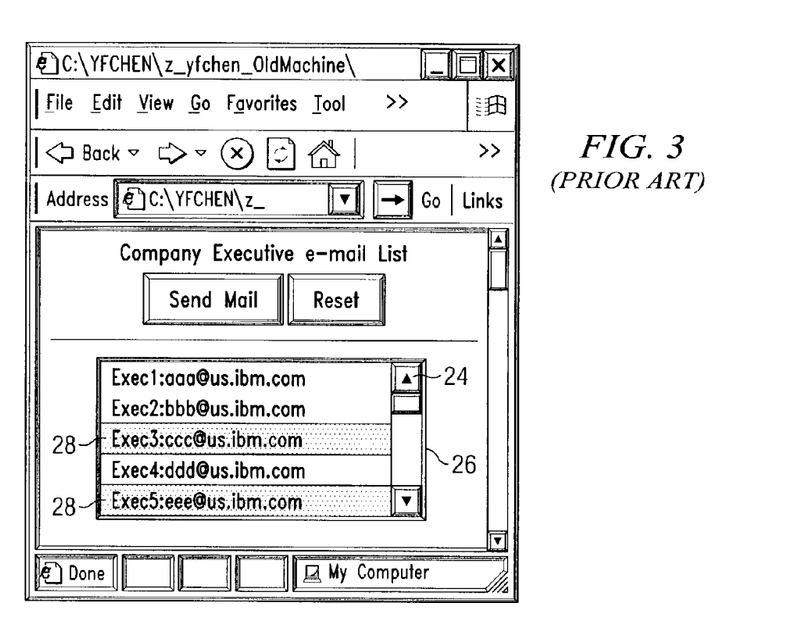
FIG. 3 is an illustration of a prior art menu containing a scroll bar in which a plurality of menu items have been selected.

Another problem encountered when designing and using drop down menus is that the user may be required to make multiple selections from a single drop down menu. A common example of a requirement for multiple selections is when a user desires to send an email to a plurality of recipients and wants to select the recipients from a drop down menu. As seen in FIG. 3, one method for allowing a user to select multiple items is a conventional scrolling menu. The user may select menu items from the list by holding the shift or control button down while selecting each desired menu item with a pointer controlled by a user input device. A conventional menu is not preferable because it requires a large amount of space on a web page.

Furthermore, if the user is making multiple selections, the previously selected items become unselected if the user does not hold down the shift key or the control key while clicking on each of the selected menu items. Losing previous selections is a particular problem with notebook computers having a touchpad to control the pointer on the graphical user interface. Therefore, a need exists for an improved method to make multiple selections from a drop down menu.

Figure 4:
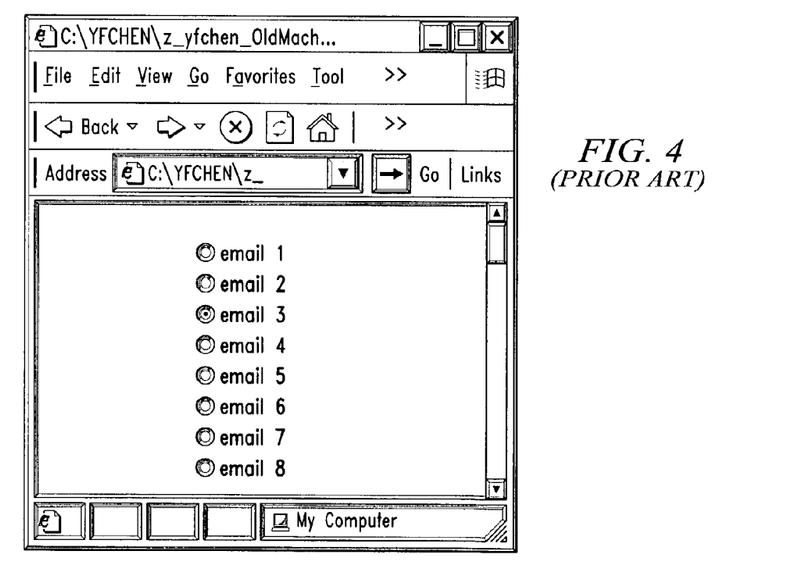
FIG. 4 is an illustration of a prior art menu with radio buttons.
Figure 5:
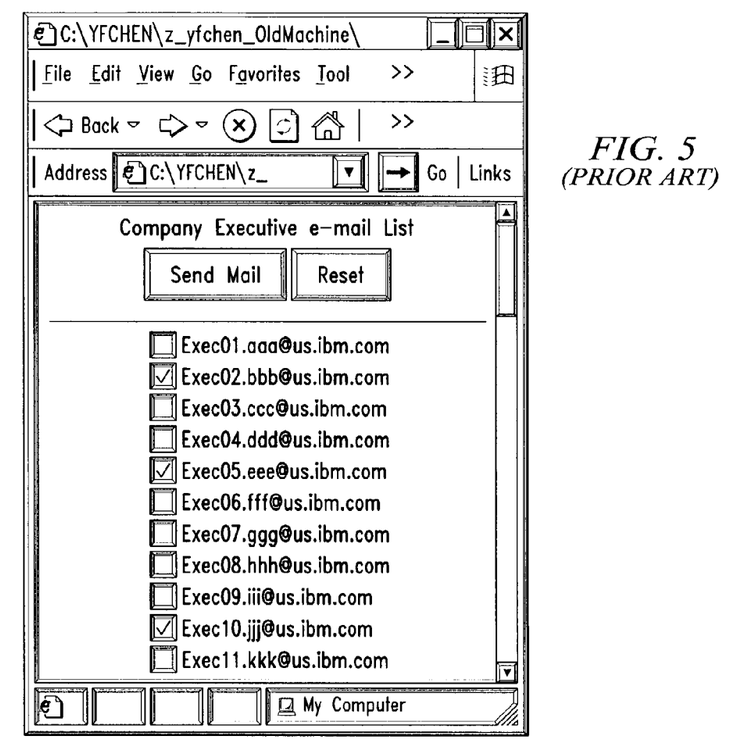
FIG. 5 is an illustration of a prior art menu with check boxes.

Alternative methods for making selections from a drop down menu also include radio buttons and check boxes. FIG. 4 is an illustration of a prior art menu utilizing radio buttons. A radio button has a first circle that, when clicked on, indicates selection of the text adjacent to the radio button by displaying a second solid circle inside the first circle. Radio buttons act like the station selector buttons on a car radio. Selecting one button in a set deselects the previously selected button, so one and only one of the options in the set can be selected at any given time. In contrast, check boxes are used when more than one option in the set can be selected at the same time. FIG. 5 is an illustration of a prior art menu with check boxes. Check boxes are used to enable or disable one or more features or options from a set. When an option is selected, an x or a check-mark appears in the corresponding box. Radio buttons and check lists utilize more web page space than drop down menus and, unlike the drop down menus, continuously display all of the available menu choices. Therefore, a need exists for an improved method to select multiple menu items from a drop down menu.

Furthermore, the prior art methods of organizing information in a drop down menu are limited. The organization of menu items in a drop down menu are currently designated by the author of the web page (in the case of web pages) or by the computer programmer (in the case of computer applications). Web page authors and computer programmers almost exclusively organize drop down menu items in chronological, alphabetical, or random order which may not be useful to a user who could benefit from an organization based on a user specific criteria such as frequency of use. Therefore, a need exists for an improved method of organizing information in a drop down menu.

Moreover, it would be advantageous for users to be able to view selected menu items apart from the unselected menu items. This would facilitate easier review and revision of multiple selections from a drop down menu. Therefore, a need exists for a method to review selected menu items apart from the non-selected items on a drop down menu.

U.S. Pat. No. 5,828,376 (the '376 patent) entitled "Menu Control in a Graphical User Interface" discloses a hyperbutton used in conjunction with a menu to manipulate items on the menu. U.S. Pat. No. 5,530,796 (the '796 patent) entitled "Menu Bar Editor" discloses a direct screen manipulation technique for drop down menus. European Patent Application Publication 0 540 445 A1 (the '445 application) entitled "Method of Representing a Set of Computer Menu Selections in a Single Graphical Metaphor" discloses a method for representing drop down menu items as icons. However, the '376 patent, the '796 patent, and the '445 application do not disclose a method for improving the process of selecting, organizing, and editing menu items from a drop down menu on a graphical user interface or a computer display.

SUMMARY OF THE INVENTION

The present invention, which meets the needs stated above, is a Drop Down Menu Program having an Item Selection Program, a Sorting Program, and a Recall Program. The Item Selection Program eliminates the need for the user to hold down the shift key or the control key while making multiple selections. Instead, the user may activate a menu item to highlight it, and activate the menu item again to remove the highlight. The user may also open and close the drop down menu at will. The Sorting Program automatically organizes the menu items in order of frequency of use. The Sorting Program also provides ascending and descending sort buttons that allow the user to sort the menu items in ascending or descending alphabetical, numeric, or chronological order. Alternatively, the menu items may appear in their default order as specified by the web designer or computer programmer. The Recall Program creates a recall list of selected menu items when the user activates a recall button. The recall list can be displayed and removed independent of opening and closing actions of the drop down menu. In an alternative embodiment, the recall list can be displayed on the drop down menu thereby eliminating the need for a recall button. In the alternative embodiment, the recall list can also separate the selected menu items from the unselected menu items.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein the term "computer" shall mean a machine having a processor, a random access memory, a memory, a display, and an operating system, capable of interaction with a user or other computer, and shall include without limitation desktop computers, notebook computers, personal digital assistants (PDAs), handheld computers, and similar devices.

As used herein the term "drop down menu" shall mean a list of one or more items that opens and closes in response to interaction with a button on a display.

As used herein the term "display" means any visual depiction of a web page or computer program's graphical user interface (GUI) that appears on the visual output device of a computer including without limitation all graphic elements appearing on the visual output device.

As used herein the term "button" shall mean any graphic element in a display that may be activated and that upon activation causes a specified function to be performed.

As used herein the term "graphic element" shall include without limitation graphic characters, graphics characters and objects.

As used herein the term "open" shall mean displaying a complete list of menu items.

As used herein the term "close" shall mean hiding a complete list of menu items.

As used herein the term "user interaction" shall mean activating a button or menu item.

As used herein the term "activate" shall mean any method of causing a button on a display to perform a specified function, including, without limitation, clicking on the button with a user input device, moving a pointer over a button without clicking on the button, or touching the image of the button on the display screen with a human hand or object, and may also mean any method of causing a menu item on a display to be selected including, without limitation, clicking on the menu item with a user input device, moving a pointer over an item without clicking the menu item, or touching the image of the menu item on the display screen with a human hand or object.

As used herein the term "highlight" shall mean calling attention to one or more displayed characters by altering the appearance of the displayed characters in response to a user interaction.

As used herein the term "recall list" shall mean a group of menu items that are selected or displayed responsive to a recall program.

As used herein, the term "user input device" shall mean a keyboard, mouse, trackball, touchpad, touchpoint device, stylus pen, touch screen, or any other type of device used to input data into a computer.

Figure 6:
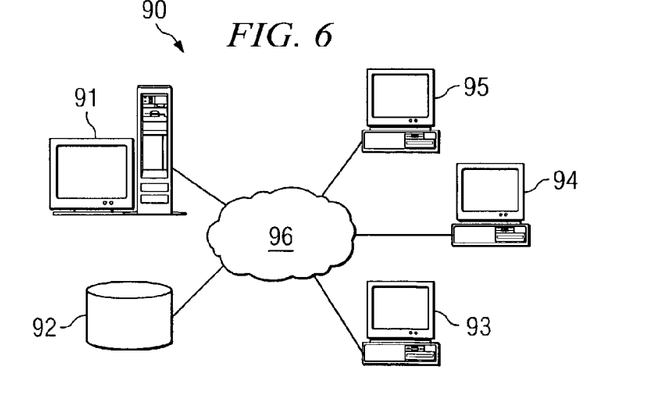
FIG. 6 is an illustration of a computer network used to implement the Drop Down Menu Program.

The internal configuration of a computer, including connection and orientation of the processor, memory, and input/output devices, is well known in the art. The present invention is a methodology that can be embodied in a computer program. FIG. 6 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 6 is intended as a representation of all possible operating systems that may contain the present invention and is not meant as an architectural limitation.

Figures 7, 8:
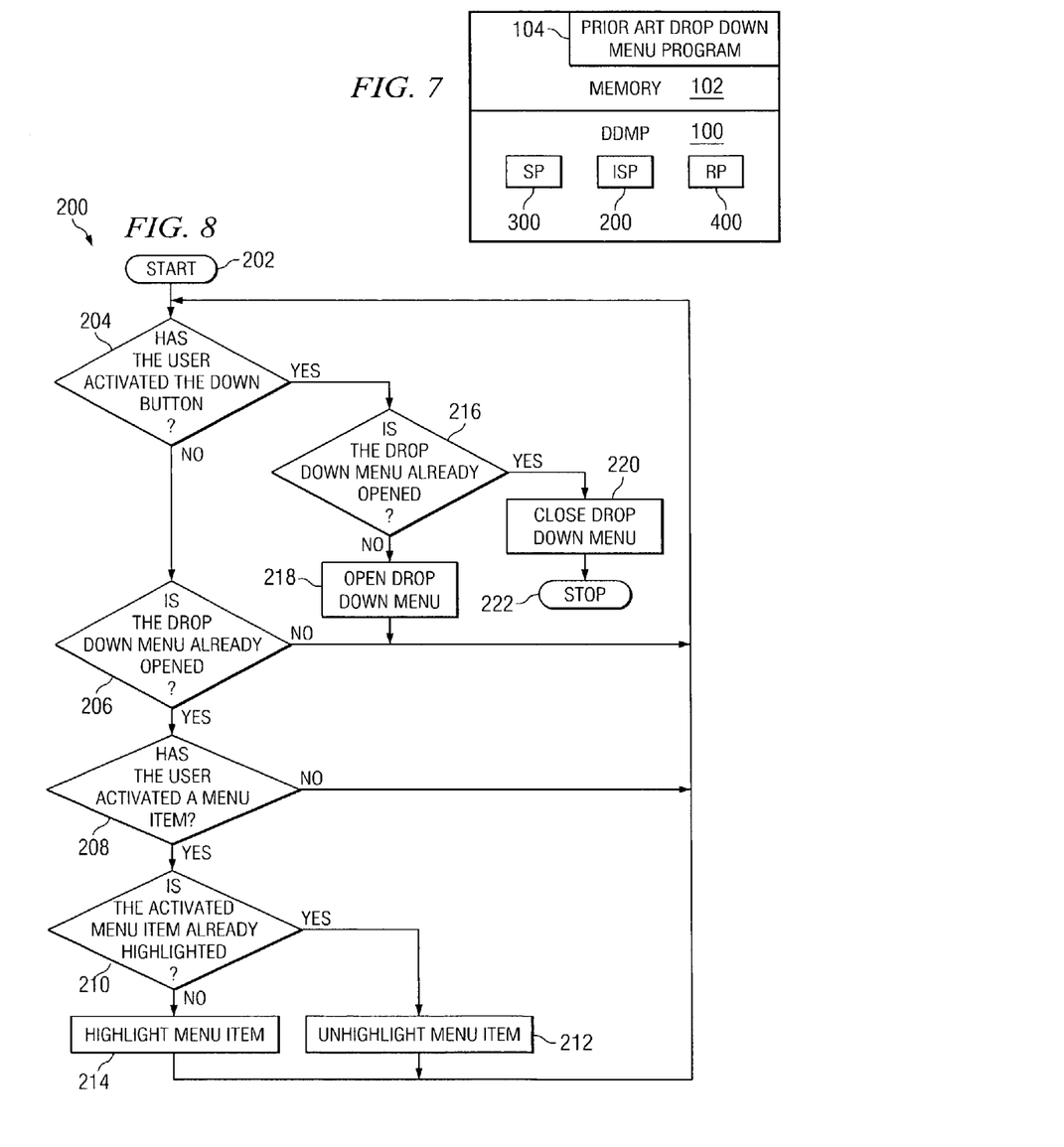
FIG. 7 is an illustration of a computer memory containing the Drop Down Menu Program.
FIG. 8 is a flowchart of the logic of the Item Selection Program (ISP)

FIG. 7 depicts Drop Down Menu Program (DDMP) 100. DDMP 100 comprises Item Selection Program (ISP) 200, Sort Program (SP) 300, and Recall Program (RP) 400. DDMP 100, ISP 200, SP 300, and RP 400 described herein can be stored within the memory of a computer on the network. Alternatively, DDMP 100, ISP 200, SP 300, and RP 400 can be stored in an external storage device such as a removable disk or a CD-ROM. Memory 102 is illustrative of the memory within the computer. The memory 102 also contains the Prior Art Drop Down Menu Program (PADDMP) 104. PADDMP 104 is a computer program which creates the prior art drop down menu. The present invention described herein is an improvement on the prior art drop down menu. Consequently, the present invention interfaces with the PADDMP 104 through memory 102. As part of the present invention, the memory 102 can be configured with DDMP 100, ISP 200, SP 300, and/or RP 400.

In alternative embodiments, DDMP 100, ISP 200, SP 300, and/or RP 400 can be stored in the memory of other computers. This configuration allows the processor workload to be distributed across a plurality of processors instead of a single processor. Further configurations of DDMP 100, ISP 200, SP 300, and/or RP 400 across various memories are known by persons skilled in the art.

FIG. 8 depicts Item Selection Program (ISP) 200. ISP 200 is best understood when viewed in conjunction with the drop down menu illustrated in FIG. 9. ISP 200 starts (202) and makes a determination whether the user has activated the down button (204). If the user has not activated the down button, then ISP 200 makes a determination whether the drop down menu is already opened (206). If the drop down menu is not already opened, ISP 200 returns to step 204. If at step 206 the drop down menu is opened, then ISP 200 makes a determination whether the user has activated a menu item (208). If the user has not activated a menu item, ISP 200 returns to step 204. If at step 208 the user has activated a menu item, then ISP 200 makes a determination whether the activated menu item is already highlighted (210). If the menu item is not highlighted, then ISP 200 highlights the menu item (214) and returns to step 204. If at step 210 the menu item is already highlighted, then ISP 200 removes the highlighting from the menu item (212) and returns to step 204.

If at step 204 the user has activated the down button, then ISP 200 makes a determination whether the drop down menu program is already opened (216). If the drop down menu is not already opened, then ISP 200 opens the drop down menu (218) and returns to step 204. If at step 216 the drop down menu is already opened, then ISP 200 closes the drop down menu (220) and ends (222). In an alternative embodiment, the user can simply position the pointer over the down button or the menu items to activate them.

Figure 9:
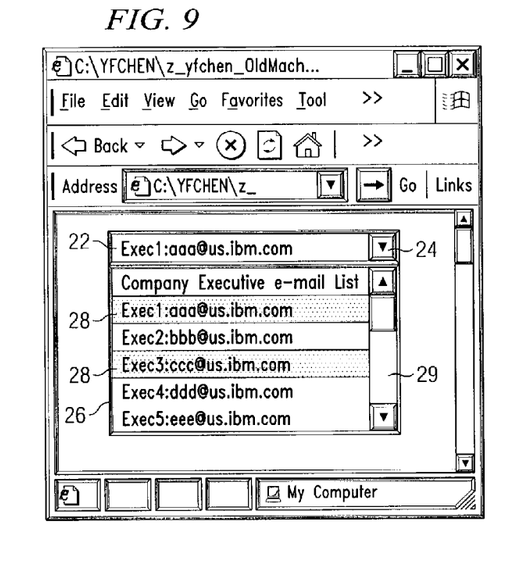
FIG. 9 is an illustration of the graphical user interface containing a drop down menu created by the ISP.

FIG. 9 is an illustration of the drop down menu created by ISP 200. The drop down menu in FIG. 9 operates similarly to a check box menu in that the user does not have to hold down the shift key or the control key when making multiple selections from the menu. Instead, as discussed in steps 208 through 214 of ISP 200, the user activates each menu item that the user desires to select, and ISP 200 highlights the desired menu item 28. If the user activates highlighted menu item 28, then ISP 200 removes the highlighting. The user may open and close the menu 26 using the down button 24. The user may also scroll through the menu using scroll bar 29 and view selected choices in dialogue box 22.

Figure 10:
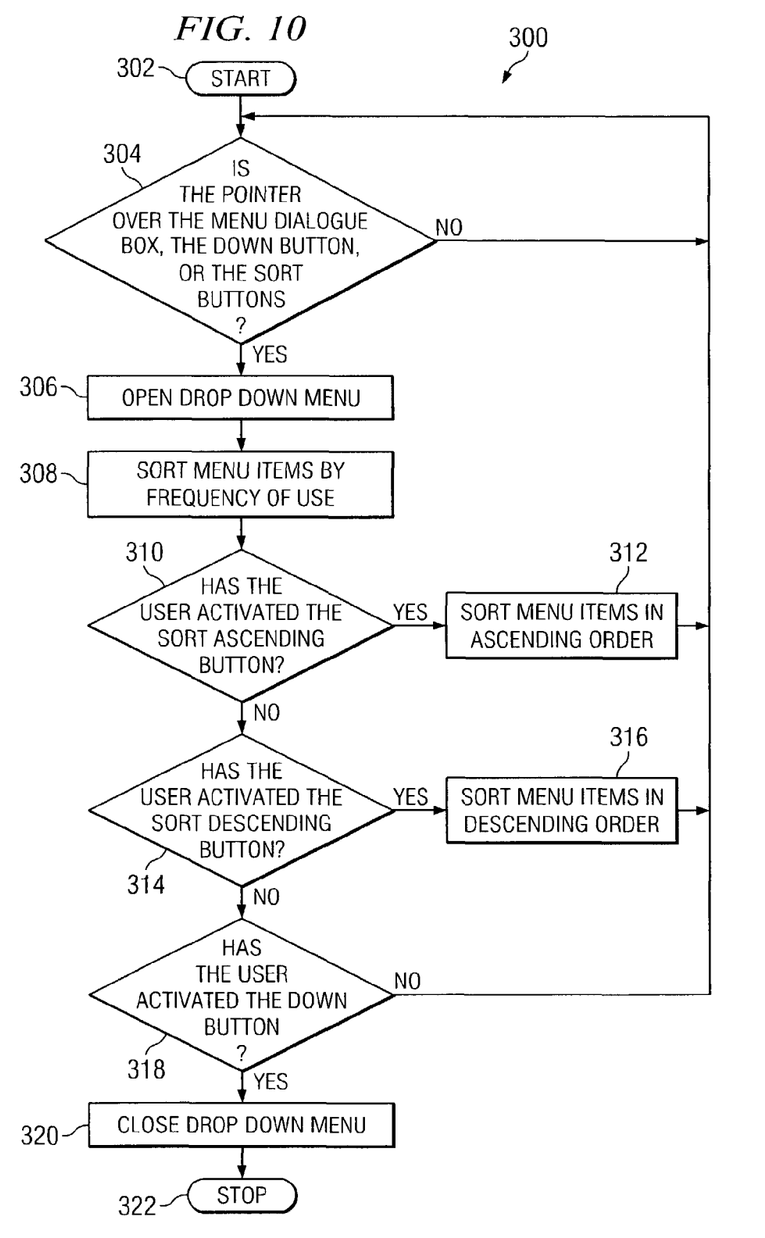
FIG. 10 is a flowchart of the logic of the Sort Program (SP)

FIG. 10 depicts Sorting Program (SP) 300. SP 300 is best understood when viewed in conjunction with the drop down menu illustrated in FIGS. 11A, 11B, and 11C. SP 300 starts (302) and makes a determination whether the pointer is over the dialogue box, the down button, or either of the sort buttons (304). If the pointer is not over the dialogue box, the down button, or either of the sort buttons, then SP 300 returns to step 304. If a step 304 the pointer is over the dialogue box, the down button, or either of the sort buttons, then SP 300 opens the drop down menu (306). SP 300 then sorts the menu items by the frequency of their use (See FIG. 11A) (308). In other words, SP 300 places the most frequently selected menu items at the top of the menu, the next most frequently selected menu item second on the menu, and so forth. The prior user selections from the drop down menus are stored in the PADDMP 104 or in the cache memory. SP 300 accesses the prior art selection data to determine the frequency of use. Alternatively, the menu items may appear in their default order as specified by the web designer or computer programmer.

SP 300 then makes a determination whether the user has activated the sort ascending button (310). If the user has activated the sort ascending button, then SP 300 sorts the menu items in alphabetically, numerically, or chronologically ascending order (See FIG. 11B) (312) and returns to step 304. If at step 310 the user has not activated the sort ascending button, then SP 300 makes a determination whether the user has activated the sort descending button (314). If the user has activated the sort descending button, then SP 300 sorts the menu items in alphabetically, numerically, or chronologically descending order (See FIG. 11C) (316) and returns to step 304. If at step 314 the user has not activated the sort descending button, then SP 300 makes a determination whether the user has activated the down button (318). If the user has not activated the down button, then SP 300 returns to step 304. If at step 318 the user has activated the down button, then SP 300 closes the drop down menu (320) and ends (322). In an alternative embodiment, the user can simply position the pointer over the down button, the sort ascending button, or the sort descending button to activate them.

Figure 11A:
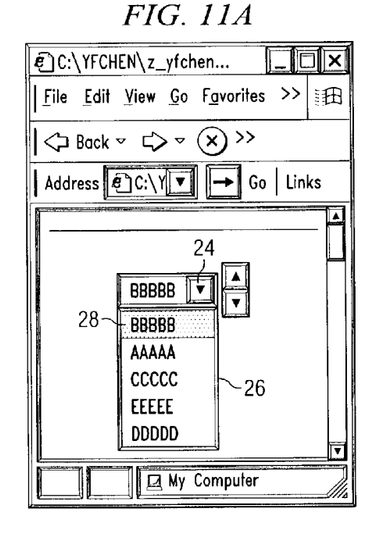
FIG. 11A is an illustration of the graphical user interface containing a drop down menu created by the SP with the menu items sorted according to the frequency of use.
Figure 11B:
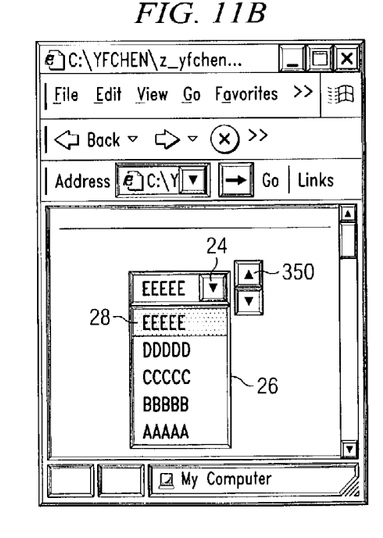
FIG. 11B is an illustration of the graphical user interface containing a drop down menu created by the SP with the menu items sorted in ascending order.
Figure 11C:
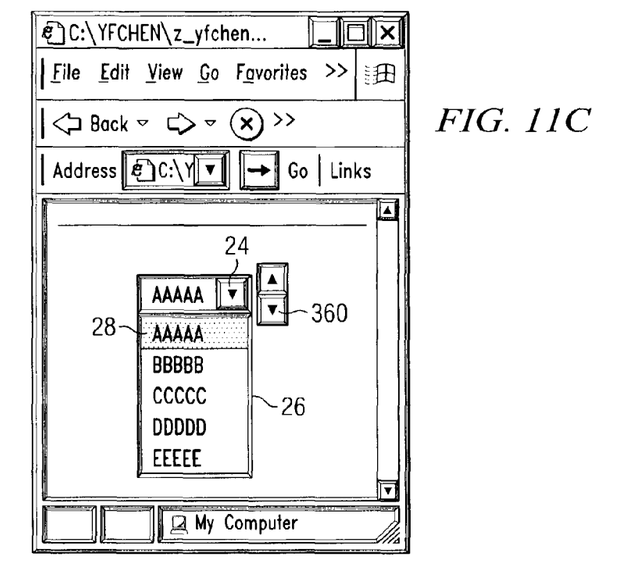
FIG. 11C is an illustration of the graphical user interface containing a drop down menu created by the SP with the menu items sorted in descending order.

FIGS. 11A, 11B, and 11C are illustrations of the drop down menu created by SP 300. FIG. 11A shows the drop down menu with the menu items sorted according to the frequency of use (i.e. from most frequently used to least frequently used, the menu items are BBBBB, AAAAA, CCCCC, EEEEE, and DDDDD). As discussed in conjunction with step 308 in SP 300, frequency sorting occurs when the user activates the down button 24 to open the menu 26. The selected menu item 28 is also displayed.

FIG. 11B shows the drop down menu with the menu items sorted in ascending order. As discussed in conjunction with step 312 in SP 300, sorting in ascending order occurs when the user activates the sort ascending button 350. Activating sort ascending button 350 causes menu 26 to open automatically. Selected menu item 28 is also displayed.

FIG. 11C shows the drop down menu with the menu items sorted in descending order. As discussed in conjunction with step 314 in SP 300, sorting in descending order occurs when the user activates sort descending button 360. Activating sort descending button 360 causes menu 26 to open automatically. The selected menu item 28 is also displayed.

Figure 12:
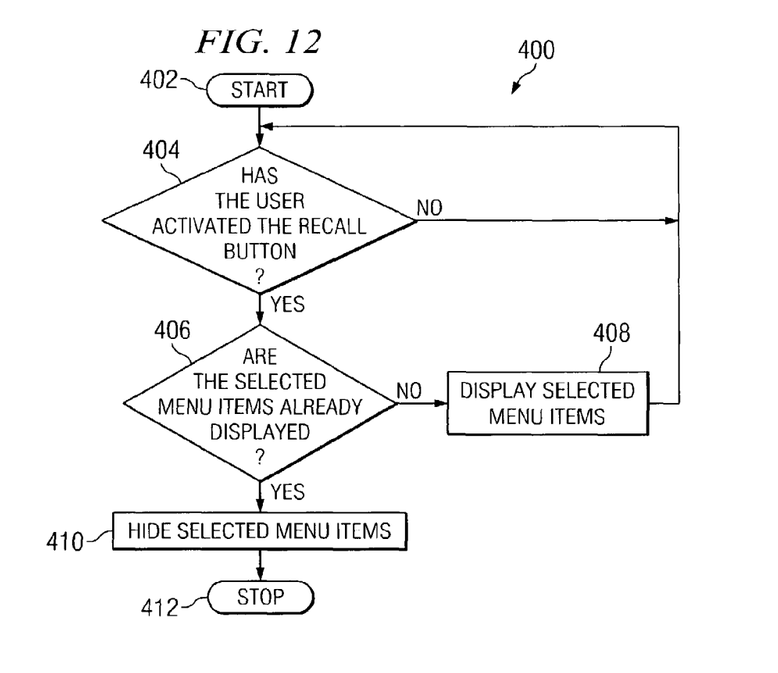
FIG. 12 is a flowchart of the logic of the Recall Program (RP)

FIG. 12 depicts a flowchart of Recall Program (RP) 400. RP 400 is best understood when viewed in conjunction with the drop down menu illustrated in FIG. 13. RP 400 starts (402) and makes a determination if the user has activated the recall button (See FIG. 13) (404). If the user has not activated the recall button, then RP 400 returns to step 404. If at step 404 the user has activated the recall button, then RP 400 makes a determination whether the selected menu items are already displayed (406). If the selected menu items are not already displayed, then RP 400 displays the selected menu items (408) and returns to step 404. If at step 406 the selected menu items are already displayed, RP 400 hides the selected menu items (410) and stops (412).

In an alternative embodiment, the user can simply position the pointer over the recall button, the menu items, or the down button to activate them. In further alternative embodiments, the drop down menu may contain configurable options such as toggling the recall list to display unselected items from the drop down menu. Additionally, in the alternative embodiment, the selected and unselected menu items can be represented by small icons such as a checkbox or an "x". Furthermore, if the user has previously used the drop down menu to make selections, another option is to display previously selected or unselected items form memory.

Figure 13:
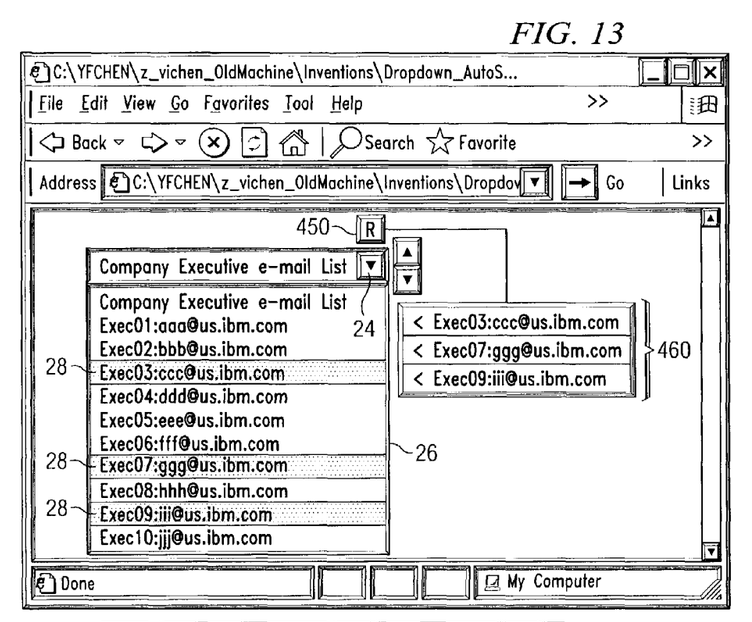
FIG. 13 is an illustration of the graphical user interface containing a drop down menu created by the RP with recall items displayed outside of the menu.

FIG. 13 is an illustration of the graphical user interface containing a drop down menu created by RP 400. As discussed in steps 406 though 410 in RP 400, when the user activates recall button 450, selected menu items 28 from menu 26 are displayed on recall list 460. Recall list 460 can be displayed using Hypertext Markup Language (HTML) or layered windows so that it does not use additional space on the web page. Both HTML and layering windows are well known in the art. The user can make recall list disappear by activating recall button 450 again. The user may also open and close menu 26 with down button 24 independent of making recall list 460 appear and disappear.

Figure 14:
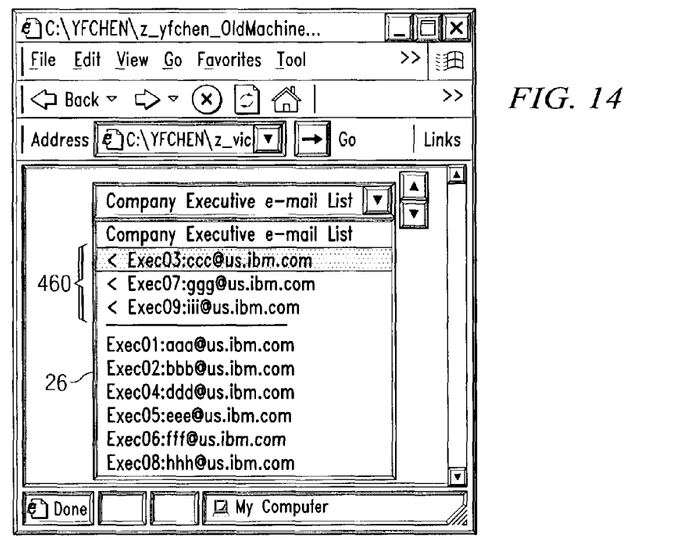
FIG. 14 is an alternative embodiment illustration of the graphical user interface containing a drop down created by the RP with recall items displayed within the menu.

FIG. 14 illustrates an alternative embodiment of the graphical user interface containing a drop down menu created by RP 400. In this alternative embodiment, there is no recall button. Instead, recall list 460 appears as part of menu 26. When the user activates one of the menu items, the selected item is automatically moved up to the recall list 460. Thus, the recall list 460 contains all of the selected items and the remainder of menu 26 contains all of the unselected items.

In another alternative embodiment of RP 400, the user can revise the selected menu items directly on the recall list. In the present alternative embodiment, the user opens the recall list and activates the menu items he desires to delete. The deleted items are then removed from the recall list. The present alternative embodiment can be implemented in conjunction with any of the embodiments described above.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for using a recall button with a drop down menu comprising:
    a computer displaying the drop down menu on a display, wherein a user has previously selected one or more items from the drop down menu;
    the computer displaying a recall button separate from the drop down menu on the display; and
    the computer, responsive to the user positioning a pointer over the recall button on the display and taking no other action, displaying a recall list at a side of the drop down menu, wherein the recall list displays the one or more items.

2. A computer system for using a recall button with a drop down menu, the computer system comprising:
    one or more processors, one or more computer readable memories, and one or more computer-readable, tangible storage devices;
    first program instructions, stored in the one or more computer-readable, tangible storage devices for execution by the one or more processors via the one or more computer readable memories, for displaying the drop down menu on a display, wherein a user has previously selected one or more items from the drop down menu;
    second program instructions, stored in the one or more computer-readable, tangible storage devices for execution by the one or more processors via the one or more computer readable memories, for displaying a recall button separate from the drop down menu on the display; and
    third program instructions, stored in the one or more computer-readable, tangible storage devices for execution by the one or more processors via the one or more computer readable memories for displaying, responsive to the user positioning a pointer over a recall button on the display and taking no other action, a recall list at a side of the drop down menu, wherein the recall list displays the one or more items.

3. A computer program product for using a recall button with a drop down menu, the computer program product comprising:
    one or more-computer-readable, tangible storage devices;
    first program instructions, stored in the one or more computer-readable, tangible storage devices, for displaying the drop down menu on a display, wherein a user has previously selected one or more items from the drop down menu;
    second program instructions, stored in the one or more computer-readable, tangible storage devices, for displaying a recall button separate from the drop down menu on the display; and
    third program instructions, stored in the one or more computer-readable, tangible storage devices, for displaying, responsive to the user positioning a pointer over a recall button on the display and taking no other action, a recall list at a side of the drop down menu, wherein the recall list displays the one or more items.

* * * * *